3,043,740
PROCESS FOR IMPROVING THE OPACITY OF CELLULOSE
Herbert Manfred Freud dit Jean Frasch, Nanterre, France, assignor to Framalite, Paris, France, a company of France
No Drawing. Filed July 22, 1957, Ser. No. 673,174
Claims priority, application France July 20, 1956
11 Claims. (Cl. 162—181)

The present invention relates to a process for considerably improving the opacity of cellulose, especially paper and to a product for use in such process.

It is known that for rendering cellulose (especially paper) opaque, it is generally considered necessary to incorporate therein what are known as mineral loading agents, which are calcined or simply dried powders which become attached between the paper fibres and partially replace the air situated between the fibres in the absence of such loading agents.

Such loading agents may in principle be divided into two groups. The first group is formed by agents, generally of low cost and having a low refractive index, which it is necessary to use in fairly large quantities to obtain a considerable improvement in opacity. Examples of this group are talc, kaolin and calcium carbonate. The second group is formed by agents, generally of high cost and having a high refractive index which, desirably in small quantities, effect a considerable improvement in opacity. Examples of this second group are zinc sulphide and especially titanium oxide in its rutile and anatase forms.

Calcined titanium dioxide is at present currently employed in paper making in proportions of between 1–10% by weight calculated on the weight of dry pulp. The use of this substance has the disadvantage that it is costly, titanium oxide being an expensive product, and the quantities which must be incorporated in a pulp for a given result being comparatively large.

According to the present invention there is provided a process for improving the opacity of cellulose comprising the steps of adding to an aqueous suspension of cellulose acid titanium gel, as hereinafter defined, and a substance giving in aqueous solution under the conditions of use a negatively charged colloid and maintaining the pH of the aqueous medium in the alkaline range.

It was surprisingly discovered that $TiO_2$ in the state of an acid gel, even when employed in relatively great quantities, gives only a small increase in the opacity of paper, the retention being poor. The effect of the acid titanium gel is considerably greater in the presence of a negative colloid and if the suspension is rendered alkaline.

By "acid titanium gel," as used throughout this specification and the appended claims, is meant the product resulting from the hydrolysis of titanium sulphate solutions (which may themselves result from the action of sulphuric acid on a mineral such as ilmenite). This product may be in the form of a pulp containing about 30–35% of $TiO_2$ or partially dried.

The negative colloids suitable for carrying out the invention are in practice all colloids which are negatively charged in alkaline solution, that is to say, on the one hand colloids whose charge sign depends upon the pH, such as silica, starch, gelatin and resins, and which sign is negative in alkaline solution, and on the other hand alkaline salts which, on hydrolysis, give an anion in colloidal form, notably the aluminate, the silicate, the zincate, the stannate, the antimonite and the resinates of Na, K and $NH_4$.

The proportion of acid gel to be introduced and the quantity of negative colloid to be added depend upon the opacity to be obtained. The acid gel may, at least in theory, vary between 1% and 100% by weight calculated on the weight of dry cellulose pulp (or between 0.25% and 30% calculated on the weight of $TiO_2$).

Generally, the acid gel will be employed in a proportion of 1% to 20% calculated on the dry weight of the pulp, or in a proportion of 0.3% to 6% of $TiO_2$ contained therein, calculated on the dry weight of the pulp.

The quantity of negative colloid to be employed for a given quantity of acid gel depends upon the state of the cellulosic dispersion to be treated, upon the nature of the colloid chosen itself and upon the opacity which it is desired to obtain.

However, preferably the quantity of negative colloid is lower than that which would cancel out the charge proper of the acid gel and would produce its discharge if it were suspended alone in water. Desirably it is in the neighbourhood of that with which the charge of the mixture is of positive sign and of a value close to that of the negative charge of the cellulosic suspension.

For paper pulp, this value is of the order of −0.01 to −0.02 volt (electrokinetic potential), but this value is difficult to measure and it is preferable to operate by successive trials.

In practice, in the case of hydrolysable alkaline salts of the type hereinbefore mentioned, a sufficient proportion is employed to make the medium alkaline, thus avoiding any further addition. In the case of colloids, the charge sign of which depends upon the pH, the medium can be made alkaline by the addition of any alkali and the proportion of colloid is preferably close to and slightly lower than that which would cancel the charge proper of the acid gel.

As is known, in the case of very dilute suspensions in the neighbourhood of neutrality, the quantities necessary for making the medium alkaline are relatively very small and the indication of an upper pH limit would have no industrial significance, since it is always necessary to limit the consumption of chemical products as far as possible.

In many cases, the order of introduction of the products into the cellulose suspension is found to be immaterial, and in particular the mixture of "acid titanium gel" and "negative colloid" can be prepared in advance.

However, in the case of some less stable colloids, it is preferable to introduce the negative colloids into the cellulose suspension before the acid gel, notably in the case of the use of a resinate.

It could not be foreseen that the retention of $TiO_2$ by a cellulose suspension is widely improved by the means described above. This retention, which is of the order of about 50–60% in the usual practice, may reach 90–95% when the $TiO_2$ is introduced as described above.

It is possible to obtain, under otherwise equal conditions, results equivalent to those obtained with calcined $TiO_2$, by using several times less $TiO_2$ when it is in the state of "acid gel." This represents a considerable saving, both by reason of the reduction of the quantities of $TiO_2$ employed and by reason of the fact that the $TiO_2$ employed is in a much less costly form than calcined $TiO_2$.

The invention covers, as new industrial opacifying products, the mixture of "acid titanium gel," as hereinbefore defined, with a substance giving a negative colloid in aqueous solution and in alkaline medium, in which the proportion of negative colloid is lower than that which would cancel the charge proper of the "acid titanium gel" if it were suspended alone in water, or more precisely in the proportions hereinbefore specified, the mixture thus obtained being suitable for sale in the form of a solution or paste, or dehydrated and in the form of a powder.

The invention is illustrated by the following non-limitative examples.

Example 1

A cellulose pulp A of standard type, giving a paper of a weight of 40 g./m.$^2$ and having an opacity of 64 as measured on the photovoltaic cell (TAPPI, Technical Association Paper Pulp Industry measurement standard) was used.

To a first portion of this pulp, there were added 10% by weight of acid titanium gel containing 3.2% of $TiO_2$. The opacity of the paper obtained rose to 67 on the photovoltaic cell.

To a second potion of this pulp, there were added 10% of a mixture of acid titanium gel and $NaAlO_2$ containing 3% of $NaAlO_2$ by weight calculated on the acid gel (that is, finally 3.1% of $TiO_2$). The opacity rose to 71 on the photovoltaic cell.

To a third portion of this pulp, there were added 10% of a similar mixture containing 6% of $NaAlO_2$ calculated on the acid gel (that is, finally 3% of $TiO_2$). The opacity rose to 74.

To a fourth portion of this pulp, there were added 10% of a similar mixture containing 9% of $NaAlO_2$ calculated on the acid gel (that is, finally 2.9% of $TiO_2$). The opacity rose to 77.

To a fifth portion of this pulp, there were added 10% of a similar mixture containing 12% of $NaAlO_2$ calculated on the acid gel (that is, finally 2.8% of $TiO_2$). The opacity rose to 79.

The quantities of $TiO_2$ retained and which were found respectively in the ash from the five portions, were calculated on the quantity introduced, as follows: 15%, 38%, 58%, 75% and 90%.

This shows the enormous increase in retention which is obtained and which constitutes an advantage, since the losses of valuable products in the water are considerably reduced.

Example 2

A cellulose pulp B of standard type, giving paper of a weight of 30 g./m.$^2$ and having an opacity of 57 as measured on the photovoltaic cell was employed.

To a first portion of this pulp were added 15% of acid titanium gel (containing 4.8% of $TiO_2$). The opacity of the paper obtained was 62 as measured on the photovoltaic cell.

To a second portion of this pulp were added 15% of an "acid titanium gel" and sodium silicate containing 3% of $NaSiO_3 5H_2O$ calculated on the acid gel (and therefore 4.56% of $TiO_2$). The opacity rose to 69.

To a third portion of this paste were added 15% of a similar mixture containing 6% of $Na_2SiO_3 5H_2O$ calculated on the acid gel (therefore 4.5% of $TiO_2$) The opacity rose to 74.5.

To a fourth portion of this pulp were added 15% of a similar mixture containing 9% of $Na_2SiO_3 5H_2O$ calculated on the acid gel (therefore 4.35% of $TiO_2$). The opacity rose to 78.5.

To a fifth portion of this pulp were added 15% of a similar mixture containing 12% of $Na_2SiO_3 5H_2O$ (and therefore 4.2% of $TiO_2$). The opacity rose to 81.

The quantities of $TiO_2$ retained and found in the ash of the papers corresponding to these five portions were respectively, calculated on the quantity of $TiO_2$ introduced into the pulp, as follows: 12%, 36%, 57%, 74% and 87%.

Here again, the increase in opacity and the increase in retention show the advantage of the process and of the products.

Example 3

A cellulose pulp C of standard type giving paper weighing 60 g./m.$^2$ and having an opacity of 75 as measured on the photovoltaic cell was employed.

There was prepared as resinate the suspension of resin in water rendered alkaline, which is commercially known under the trademark Bewoid. This suspension has a pH value of 8.

To a first portion of this pulp were added 6% of acid titanium gel (that is, 1.8% of $TiO_2$). The opacity of the paper obtained rose to 78 as measured on the photovoltaic cell.

To a second portion of this pulp were added 4% of the suspension of resinate. The opacity of the paper obtained dropped to 73.5.

To a third portion of this pulp were added 6% of acid gel and 2% of resinate. The opacity of the paper obtained rose to 82.

To a fourth portion of this pulp were added 6% of acid gel and 4% of resinate. The opacity of the paper obtained rose to 85.

Papers opacified by the method, or with the products described above, are readily recognizable on analysis, notably by reason of the apparent volume of the ash in relation to its weight, in comparison with the ash of paper loaded with calcined $TiO_2$, the apparent volume of which with equal weight, is smaller by several times.

What I claim and desire to secure by Letters Patent is:

1. Method of improving the opacity of cellulose, which comprises treating suspended cellulose with an aqueous alkaline medium containing $TiO_2$ formed of acid titanium gel which has been rendered alkaline by action of said alkaline medium and also containing a colloid which in said aqueous alkaline medium has a negative charge.

2. Method of improving the opactiy of cellulose, which comprises treating suspended cellulose with an aqueous alkaline medium containing approximately 0.3–6% of $TiO_2$ calculated as dry weight to dry weight of cellulose, said $TiO_2$ being formed of acid titanium gel which has been rendered alkaline by action of said alkaline medium and also containing a colloid which in said aqueous alkaline medium has a negative charge.

3. Method of improving the opacity of cellulose, which comprises treating suspended cellulose with an aqueous alkaline medium containing $TiO_2$ formed of acid titanium gel which has been rendered alkaline by action of said alkaline medium and also containing a colloid which in said aqueous alkaline medium has a negative charge; and adding alkali to maintain the pH of said aqueous medium in alkaline range.

4. Method of improving the opacity of cellulose, which comprises treating suspended cellulose with an aqueous alkaline medium containing $TiO_2$ formed of acid titanium gel which has been rendered alkaline by action of said alkaline medium and also containing a colloid which in said aqueous alkaline medium has a negative charge and being selected from the group consisting of starch and gelatin.

5. Method of improving the opacity of cellulose, which comprises treating suspended cellulose with an aqueous alkaline medium containing $TiO_2$ formed of acid titanium gel which has been rendered alkaline by action of said alkaline medium and also containing a colloid which in said aqueous alkaline medium has a negative charge and being selected from the group consisting of sodium, potassium and ammonium aluminates, silicates, zincates, stannates, antimonites and resinates.

6. Method of improving the opacity of cellulose, which comprises treating suspended cellulose with an aqueous alkaline medium containing $TiO_2$ formed of acid titanium gel which has been rendered alkaline by action of said alkaline medium and also containing an alkaline salt of a colloid, which salt upon hydrolysis in alkaline aqueous medium forms a colloidal anion.

7. Composition for use in improving the opacity of cellulose, said composition comprising an aqueous alkaline medium containing $TiO_2$ in the form of acid titanium gel, and a colloidal substance which in said aqueous alkaline medium has a negative charge.

8. Composition for use in improving the opacity of cellulose, said composition comprising an aqueous alkaline medium containing $TiO_2$ in the form of acid titanium gel, and a colloidal substance which in said aqueous alkaline medium has a negative charge and being selected from the group consisting of starch and gelatin.

9. Composition for use in improving the opacity of cellulose, said composition comprising $TiO_2$ in the form of acid titanium gel, and an alkaline salt of a colloid, which salt upon hydrolysis in alkaline aqueous medium forms a colloidal anion, said alkaline salt being present in an amount such that when said composition is distributed in aqueous medium the medium becomes alkaline.

10. Composition for use in improving the opacity of cellulose, said composition comprising $TiO_2$ in the form of acid titanium gel, and an alkaline colloidal substance which in aqueous alkaline medium has a negative charge and being selected from the group consisting of sodium, potassium and ammonium aluminates, silicates, zincates, stannates, antimonites and resinates, said alkaline colloidal substance being present in an amount such that when said composition is distributed in aqueous medium the medium becomes alkaline.

11. Composition for use in improving the opacity of cellulose, said composition comprising $TiO_2$ in the form of acid titanium gel, a colloidal substance which in aqueous alkaline medium has a negative charge, and an alkali in an amount sufficient to yield an alkaline pH when said composition is distributed in aqueous medium.

References Cited in the file of this patent

UNITED STATES PATENTS

| | | |
|---|---|---|
| 1,504,669 | Blumenfeld | Aug. 12, 1924 |
| 1,692,372 | Gardner | Nov. 20, 1928 |
| 1,959,765 | Saklatwalla et al. | May 22, 1934 |
| 2,121,341 | Dreyfus | June 21, 1938 |
| 2,345,980 | Keats | Apr. 4, 1944 |
| 2,563,656 | Millhiser | Aug. 7, 1951 |
| 2,576,434 | Ancrum | Nov. 27, 1951 |

FOREIGN PATENTS

| | | |
|---|---|---|
| 520,701 | Great Britain | May 1, 1940 |

OTHER REFERENCES

Casey: Pulp and Paper vol. I, 1952, published by Interscience Pub., New York, N.Y., pp. 532–533.